Figure 1:
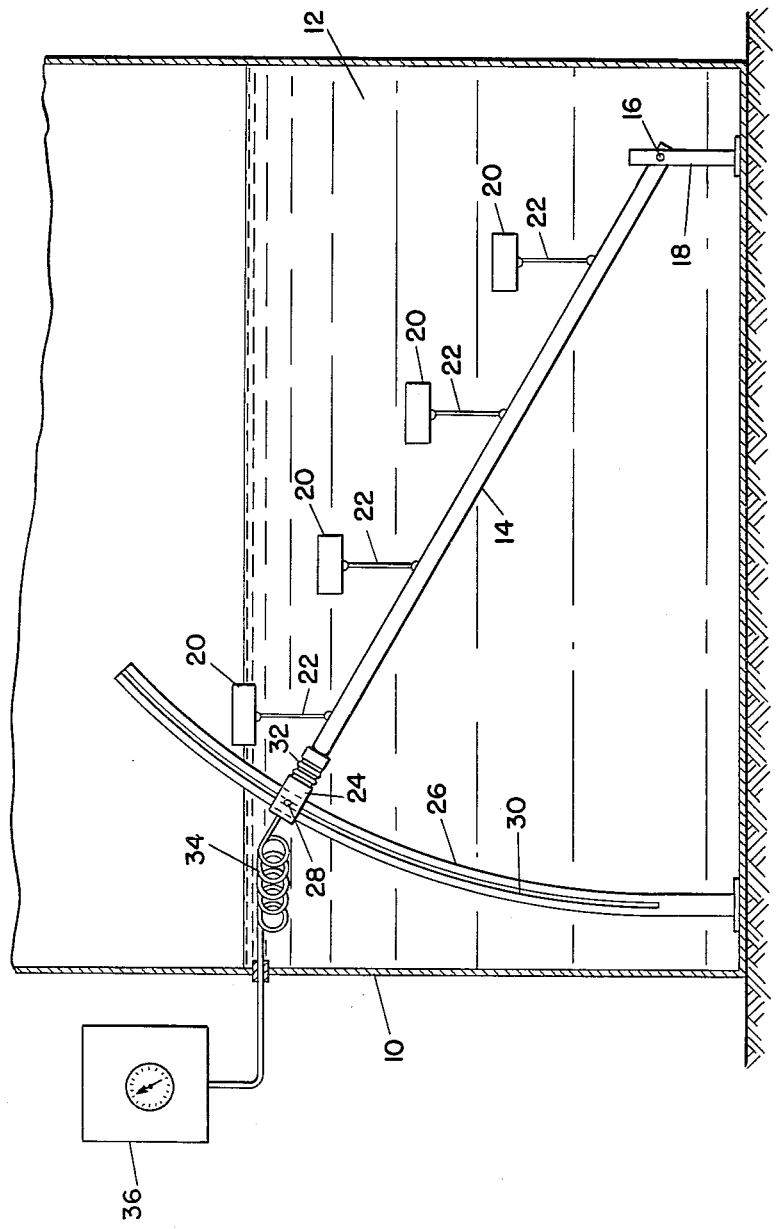

May 22, 1956

H. A. QUIST
APPARATUS FOR DETERMINATION OF AVERAGE
TEMPERATURE OF FLUIDS IN STORAGE 2,746,293

Filed June 5, 1952

4 Sheets-Sheet 1

INVENTOR.
HAROLD A. QUIST

BY Robert O. Spindle

ATTORNEY

May 22, 1956  H. A. QUIST  2,746,293
APPARATUS FOR DETERMINATION OF AVERAGE
TEMPERATURE OF FLUIDS IN STORAGE
Filed June 5, 1952  4 Sheets-Sheet 2

INVENTOR.
HAROLD A. QUIST
BY
Roberto. Spurdle
ATTORNEY

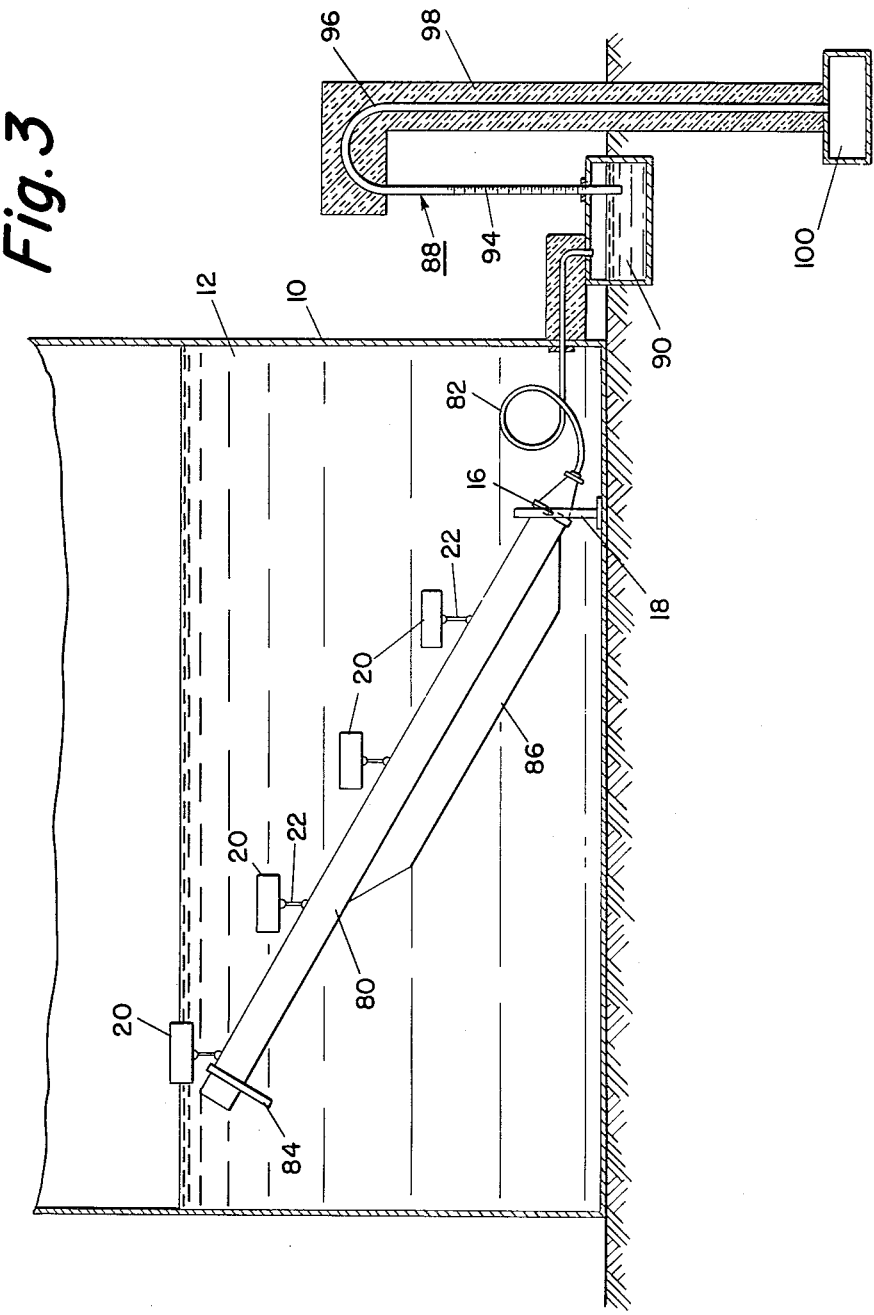

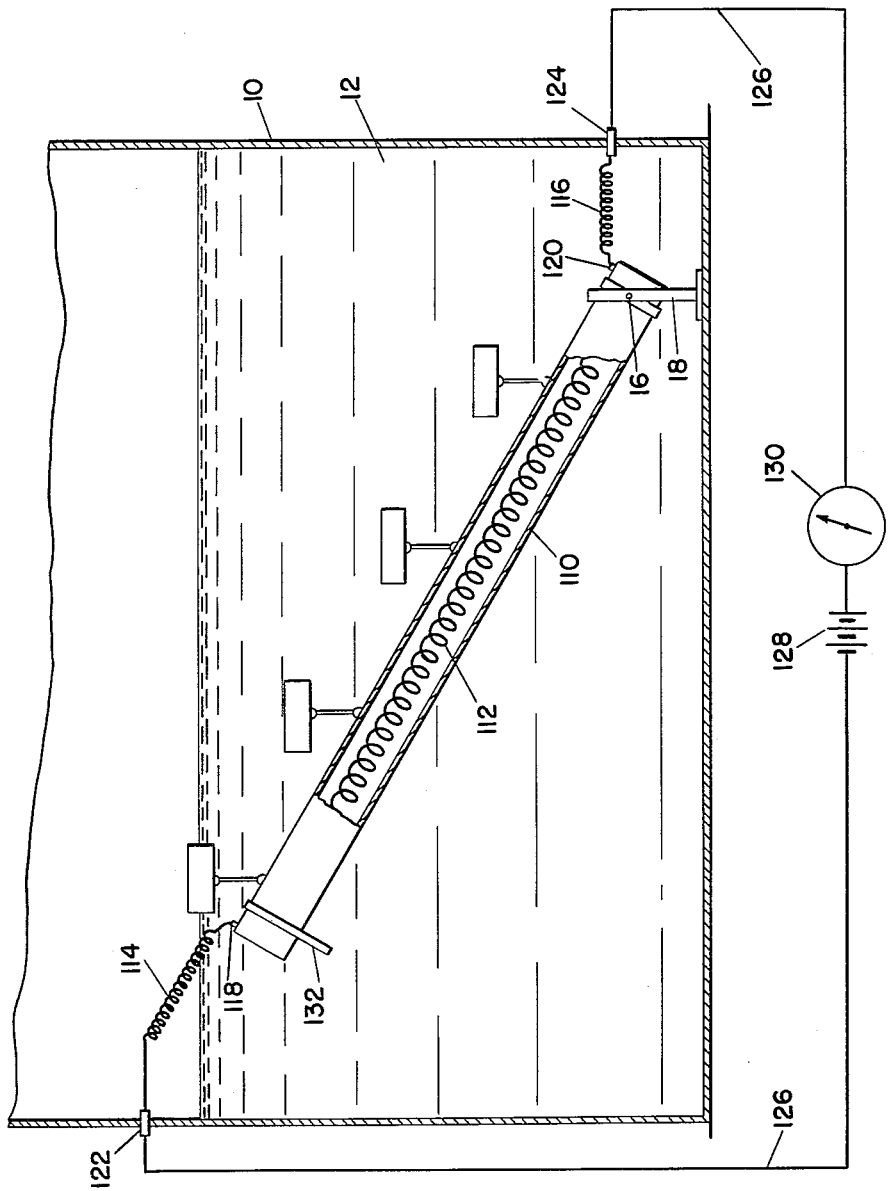

United States Patent Office 2,746,293
Patented May 22, 1956

2,746,293

APPARATUS FOR DETERMINATION OF AVERAGE TEMPERATURE OF FLUIDS IN STORAGE

Harold A. Quist, Swarthmore, Pa., assignor to Sun Oil Company, Philadelphia, Pa., a corporation of New Jersey Application June 5, 1952, Serial No. 291,836

3 Claims. (Cl. 73—353)

This invention relates in general to temperature measurements and more particularly to devices for measuring the average temperature of stored liquids which are subject to volume changes during the storage period.

Such conditions occur in the storage of petroleum products especially. As the various liquids resulting from the refining of oil are produced, they are stored in large receptacles. These stored quantities are withdrawn to supply manufacturing and sales needs. Consequently, the stored volume is always subject to change. It is an object of this invention to provide a temperature measuring device which will remain submerged in the liquid bulk at all levels and be exposed to the varied temperatures therein.

Many of the liquid petroleum products stored as described and for which this device is intended are volatile by nature. Sale and distribution is based on volume measurements referred to accepted base temperatures. Thus it is necessary to know the average temperature of the mass of the stored liquid and correct the volume of the delivered bulk to the accepted base temperature.

It is the present practice to take a number of readings, either manually or automatically, at selected depths in the liquid body and average the results. This procedure has many objectionable features leading to dissatisfaction for both the vendor and purchaser. It is a further object of this invention to provide a temperature measuring device which averages the liquid strata temperatures within itself, for all depths of the liquid, indicating the resultant average temperature without the need of further calculation.

Another correction which must be considered in the sale of stored volatile liquids involves the variability of the liquid temperatures within short periods of time. The seasons of the year, climatic conditions, geographic location and the time of the day all have an effect. Consequently, no matter how accurate or how well calculated a series of measurements may be, readings taken at prearranged periods will be in error for intervening use. It is still a further object of this invention to provide an average temperature measuring device which operates continuously and is immediately available at all times.

In general, the invention comprises a temperature responsive element pivotally anchored on one end near the bottom of the liquid body. The free end is floated at a selected depth relative to the liquid surface exposing the responsive element to all the stratified variations of temperature in the liquid body. The element being uniformly responsive to temperature changes throughout its length averages the various temperatures and responds according to its character for all depths of the liquid. A calibrated indicator or recorder connected responsively to the element shows the average temperature continuously and accurately.

Other objects of the invention will be apparent from the following specification and an inspection of the drawings in which:

Figures 1 to 4 are elevational views in section of various forms of the invention.

It is evident from the Figures 1 to 4 of the drawings that the invention, generically, requires two parts, an elongated temperature responsive element arranged to be exposed to the varied temperature strata of the liquid body under all conditions, and a temperature calibrated responsive indicator connected to the element. The figures of the drawing show selected modified forms of this concept.

The illustrations are not intended to exhaust the possibilities of the many ways in which the idea may be used. It is intended, however, to illustrate and describe the most practical forms useful for the described purposes.

Referring now to Figure 1, the storage vessel 10 is adapted to hold the liquid 12 which is subject to change in volume depending on additions and withdrawals due to manufacture and sales. A thermal responsive element 14 having a high coefficient of expansion is connected by the pivot 16 to, an anchor or support 18 proximate the bottom of the body of liquid 12. To indicate rotation of the element 14 about the pivot 16 in response to varying elevations of the liquid, a plurality of floats 20 are shown attached to the element by connectors 22. The number of floats 20 may be reduced to one and the lengths of the connectors so modified to suit the purpose of the user, or eliminated by substituting a naturally buoyant thermal element.

Although the temperature responsive element 14 is preferably of metal it may be of any sufficiently strong material having a high coefficient of expansion which responds in a predeterminable way to temperature changes. There is a wide selection of metals to be used such as iron, copper, aluminum, manganese, zinc, to mention a few of the pure metals, together with innumerable alloys of these and others. In order to measure temperature averages in all floated positions in the liquid the element should be substantially, uniformly responsive throughout its length in temperature response. This is evident when it is considered that the average temperature transmitted to the indicator may be the result of a large number of different temperatures occurring when the element approaches a vertical position, or is the effect of one strata when it is in a horizontal position.

At the free end of the element 14 a housing 24 is mounted in a guide 26 rigidly fastened in the receptacle or storage tank 10. The housing is movably positioned in the guide by a sliding fixture such as connector 28. The connector 28 is fitted into a groove 30 and the housing 24 is free to lift and lower with the floated movement of the element 14. An expansive-contractive fitting 32 such as a single or multiple diaphragm is positioned to engage the element 14 and transmit the temperature response to a fluid medium or the like within the housing 24. A flexible connector 34 shown here as a coiled conduit transmits the temperature response of the element through the wall of the receptacle to a temperature calibrated mechanism 36 mounted externally of the storage vessel.

Figure 2:
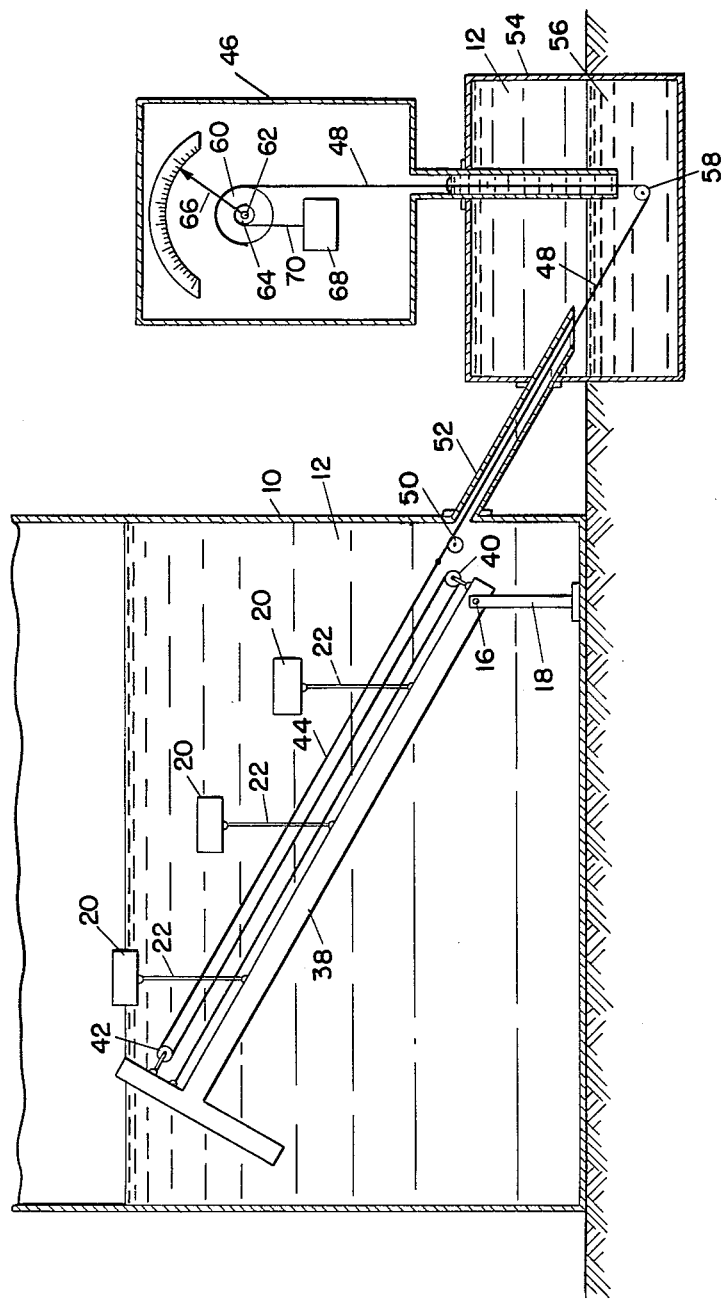

Reference to Figures 2, 3 and 4 will show the application of substitutes for the thermal responsive element 14 and also the indicating or recording mechanism 36, required in some cases because of the nature of the thermal responsive medium. To those versed in the art, these and other modifications of the basic idea described above will be self-evident. However, to indicate fully the several advantages of thes specific applications and to better justify breadth in the generic definition of the combination, these figures will be described in detail. In these separate descriptions, those elements which are common to all the figures will be numbered alike. This procedure will shorten the application and point up the distinguishing features between the several specific structures.

In Figure 2, the storage receptacle 10 supporting the stored liquid 12 is shown with a modification of the thermal responsive element. Here a support 38 is pivotally anchored as in Figure 1 and by means of pulleys or like bearings 40 and 42 suspends a wire 44 within the liquid 12. It is understood that the thermal element 44 may vary between wide limits of length and may be almost any material having uniform thermal responsive characteristics throughout its length. The term "wire" is used to indicate the shape of the element wherein the cross sectional dimension is much less than its length, but is not intended to exclude tapes, strands or other synonyms for the term.

The position of the support 38 and the unrestricted thermal responsive element 44 is maintained in the liquid by a buoyant means indicated as being similar to the floats 20 and connectors 22 already described. The T bracket on the end of the support 38 made necessary to support the element holder 42 and to maintain position above the horizontal may well be used to hold a single buoyant member to achieve the same result. If made of a light weight material such as aluminum and of sufficient size, it will float without additional buoyant members.

In this instance the nature of the thermal element requires a modification of the temperature indicator or recorder. To preclude temperature variations between the element 44 and the indicator here numbered 46, the connector 48 is preferably non-responsive to temperature conditions. It is supported to align with the element 44 in the tank 10 by a pulley 50. A conduit 52 is provided to transmit the connector 48 from the tank to a sealed container 54 external the vessel 12 and in line with pivoted anchor 18 of the support 38. The liquid 12 from the storage tank is conducted to the sealed container 54 and fills the upper part over a denser liquid 56 such as mercury, glycol or glycerine which acts as a seal. The properly calibrated temperature indicator 46 is connected to the sealed container 54 by a tube sufficiently long to enter the liquid seal 56. This construction admits the connector 48 passed over a pulley 58 in the container 54 to change direction to the indicator.

Within the indicator 46, the well known double sheave arrangement is used to keep a proper tension on the connector 48. A large diameter sheave 60 to which the connector 48 is fastened is mounted on a common shaft 62 with a smaller sheave 64 both of which are in direct connection with the pointer means 66. A weight 68 is applied to the smaller diameter sheave 64 by a cord 70. In this way a constant tension is transmitted to the connector 48 which does not deviate for any position of the pointer. The advantages of such a structure are well known and need not be itemized here.

Referring now to Figure 3, the storage tank 10, liquid 12, anchor or support 18 and pivot 16 are as previously described. The thermally responsive element support is a tube 80 sealed on its free end and connected at the pivoted end to a flexible conduit 82. A leg 84 and longitudinally extending stand 86 are added to the tube 80 to support it in a horizontal position when the liquid level is reduced to a minimum. These support elements prevent undue strain on the tube and connections and limit the operational depth of the device. A fluid in gaseous form such as nitrogen, carbon dioxide, or in liquid form such as gasoline, alcohol, or the like is placed in the tube 80 at a predetermined initial pressure calculated to indicate the proper temperature changes on the indicator generally indicated by the numeral 88.

The indicator 88 illustrated is one of many forms which may be used with a thermally responsive fluid. A liquid 90, such as glycol or glycerine, partially fills a sealed container 92. The container is partly buried in the ground to minimize the effects of surrounding temperatures and preferably should be further insulated. A transparent scale 94 is calibrated to show the average temperature of the stored liquid 12 as reflected by the response of the thermal responsive fluid contained in the sealed tubular support 80. Except for that portion of the scale 94 which must be seen and read, the tube 96 is insulated as by the covering 98 and leads into an inert gas reserve 100 which is calculated to act in back pressure as a constant and is located deep in the ground to have as little temperature effect as possible.

Another specific form which the combination of elements may logically take is shown in Figure 4. The basic structure of the storage tank 10, stored liquid 12, anchor or support 18 and pivot 16 are shown in the same relative positions and for the same purposes as above described. Again, as in Figure 3, a sealed tubular support 110 is used to carry the thermal responsive element. The difference between these two figures is that the tubular support of Figure 4 is sealed on both ends and the thermal responsive element 112, in this figure, is an electrical element capable of conducting electricity in varying quantities controlled by surrounding temperatures. To facilitate the effect of the temperatures present in the liquid 12 upon the electrical conductor 112 the tubular support 110 may be filled with a gas having the characteristics of thermal absorption, dispersion and rapid transmittal such as hydrogen, helium, neon, or the like, to more readily impress the average temperature conditions thereon. Although this structure of the electrical element carried within a gas filled tube has particular advantages afforded by the gas envelope such as immediate and even temperature distribution, a simpler device can be constructed using the same principle. A sufficiently rigid electrical conductor can be mounted with insulators to take the place of the support 110, or an electrically conducting coil can be wound externally on an insulating support.

In either case the flexible connectors 114 and 116 connect to the conductor 112 at the respective electrical contacts 118 and 120. These contacts are shown separated by the length of the tubular support 110 for clarity which may be the form of construction, or they may be grouped at either end of the tubing. The connectors are led out of the storage tank through insulating sleeves 122 and 124 which are also leak-proof to retain the stored product. The remainder of the electrical circuit comprising conductor 126, a power supply 128 and a current responsive device 130 calibrated to read average temperatures of the stored liquid are as conventionally shown. The bracket 132 is used to support the tube 110 as the liquid level approaches the bottom of the tank to prevent injury to the equipment or to position the element at the selected operating level.

There is no need to emphasize the structural features of the several forms of the invention shown. They appear self evident. To those versed in the art, the illustrated embodiments will suggest advantages distinguishing each for particular usage. Further the many variations afforded by different combinations and substitutions will be evident. However, to suggest the important uses of the general and specific applications of the disclosed structures, it is proposed to describe briefly the advantages and operation of each of the figures.

Broadly, the illustrated embodiments are all directed to measuring the average temperature, constantly and accurately, at any level of the liquid by a responsive means which in itself averages the variations of temperatures surrounding it. To maintain the temperature responsive means always in contact with the strata of liquid in which the temperature changes occur and not permit this means to be subject to other media, the element is fastened and floated within the confines of the liquid or selected strata thereof. It will be evident that this element may be raised or lowered in the stored liquid and so controlled in movement as to be restricted to any limited volume of liquid or liquids. In this manner it may be used in the water layer normally maintained at the bottom of a tank storing hydrocarbons, or raised to any desired level above the water layer. Further, it may be multiplied to include several such mechanisms to give separate average temperature measurements in any number of layers, if so desired.

The operation, in general for all the illustrated embodiments, requires only such response in the element as will operate the indicator. Expansion or contraction are equally acceptable, if this response is always the same, and in the same amount for the repetition of like conditions. The temperature responsive elements in Figures 1, 2 and 3 function in this way. The associated indicators or recorders 36, 46 and 88 are shown completing an operating mechanism but may be readily changed to be used in either proximate or remote locations.

With the exception of Figure 1 in which the temperature responsive element supports itself, all the remaining devices use a support. There is no particular advantage in this arrangement. Even where the supports as shown in Figures 2 to 4, inclusive, are made of metal and are, in themselves responsive to temperatures, the calibration of the indicator takes these variations into consideration. To prevent error, however, the supports, too, should respond uniformly throughout their length as is required of the element.

The combinations shown in Figures 1 and 4 lend themselves particularly for remote indications, while Figures 2 and 3 are designed, particularly, for use adjacent the storage tank.

It is obvious that the illustrated forms are selected to show only a few of many variations this invention may take. Combinations, interchanges, and substitutions may be made without departing from the spirit and scope of the invention which, as stated, is primarily concerned with obtaining a constant and correct average temperature reading of bulk stored liquids subject to variations in volume during the storage period.

I claim:

1. A device for continuously measuring the average temperature of a body of liquid subject to variations in quantity in combination with a storage vessel comprising an elongate member uniformly responsive throughout its longitudinal extent to surrounding temperature conditions, a pivotal connection maintaining one end of said member proximate the bottom of the liquid body, float means attached to said member to rotatably position the member about the pivotal support in maximum contact with the liquid at all levels thereof, and means to indicate the temperature response of said member including a housing adapted to contain a volume of fluid, an arcuate bracket extending upwardly from the bottom of the storage vessel in spaced relation from and in the path of travel of the free end of the pivoted temperature responsive member, a support member slidably contacting said arcuate bracket and supporting said housing, a diaphragm mounted on said housing and constructed to operably engage the free end of said temperature responsive member, an indicator calibrated in degrees of temperature exterior said storage vessel and connecting means to transmit diaphragm response to the pressure conditions from said housing to the indicator.

2. A device for continuously measuring the average temperature of a body of liquid in a storage receptacle and subject to variations in quantity comprising an elongate member uniformly temperature responsive throughout substantially its entire length positioned in average temperature sensing relation with said liquid, pivoting means within the receptacle positioning one end of said elongate member proximate the bottom of said receptacle, float means connected to the free end of said member pivoting the same in response to changes in the liquid level in said receptacle, resilient means responsive to the thermal effect in said elongate member operatively engaging the free end of the same in the receptacle, indicating means calibrated in degrees of temperature mounted exteriorly of said receptacle, and means connecting said resilient means with the indicating means.

3. The device defined in claim 2 further characterized by the resilient means extending into operating contact with the elongate member including a gas filled compressible container adjacent the end of said member, and positioning means securing asid container in operating engagement with the elongate member.

References Cited in the file of this patent

UNITED STATES PATENTS

| 462,371 | Callendar | Nov. 3, 1891 |
| 712,699 | May | Nov. 4, 1902 |
| 1,672,229 | Pairman | June 5, 1928 |
| 1,777,415 | Morgan | Oct. 7, 1930 |
| 1,982,970 | Star | Dec. 4, 1934 |
| 2,625,043 | Tapp et al. | Jan. 13, 1953 |
| 2,675,706 | Edgar | Apr. 20, 1954 |
| 2,677,276 | Schmidt | May 4, 1954 |

FOREIGN PATENTS

| 528,897 | France | Aug. 27, 1921 |
| 799,445 | France | Apr. 4, 1936 |